US012761754B2

(12) United States Patent
Lin et al.

(10) Patent No.: US 12,761,754 B2
(45) Date of Patent: Oct. 13, 2026

(54) TOUCH DISPLAY DEVICE

(71) Applicant: E Ink Holdings Inc., Hsinchu (TW)

(72) Inventors: Chen Cheng Lin, Hsinchu (TW); Hung Wei Tseng, Hsinchu (TW); Fang Chia Hu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/748,105

(22) Filed: Jun. 20, 2024

(65) Prior Publication Data

US 2024/0338097 A1 Oct. 10, 2024

Related U.S. Application Data

(62) Division of application No. 18/091,380, filed on Dec. 30, 2022, now abandoned.

(30) Foreign Application Priority Data

Feb. 16, 2022 (TW) ................................ 111105524

(51) Int. Cl.
*G06F 3/041* (2006.01)
*F21V 8/00* (2006.01)
(Continued)

(52) U.S. Cl.
CPC ......... *G06F 3/0418* (2013.01); *G02B 6/0043* (2013.01); *G02F 1/13338* (2013.01);
(Continued)

(58) Field of Classification Search
None
See application file for complete search history.

(56) References Cited

U.S. PATENT DOCUMENTS 9,141,224 B1 * 9/2015 Rowe .................... G06F 3/0443
9,684,338 B1 * 6/2017 Menon ................ G02B 6/0011
(Continued)

FOREIGN PATENT DOCUMENTS

CN 103294238 9/2013
CN 205353999 6/2016

OTHER PUBLICATIONS

"Office Action of China Counterpart Application", issued on Apr. 1, 2026, p. 1-p. 7.

*Primary Examiner* — Christopher R Lamb
(74) *Attorney, Agent, or Firm* — JCIPRNET

(57) ABSTRACT

A touch display device includes a reflective display module, a touch sensing layer, a light guide member, a ground shielding layer, and a first adhesive layer. The touch sensing layer is disposed on a display surface of the reflective display module, and the light guide member is disposed between the reflective display module and the touch sensing layer. The ground shielding layer is in contact with the light guide member and located between the light guide member and the touch sensing layer. The ground shielding layer electrically connects to one of the reflective display module and the touch sensing layer to electrically connect to a ground potential through the one of the reflective display module and the touch sensing layer. The first adhesive layer is disposed between the light guide member and the reflective display module, and is located between the ground shielding layer and the reflective display module.

6 Claims, 6 Drawing Sheets

(51) Int. Cl.

| | |
|---|---|
| ***G02F 1/1333*** | (2006.01) |
| ***G02F 1/167*** | (2019.01) |
| ***G02F 1/16753*** | (2019.01) |
| ***G06F 3/044*** | (2006.01) |

(52) U.S. Cl.

CPC ............ *G02F 1/167* (2013.01); *G06F 3/0412* (2013.01); *G06F 3/0443* (2019.05); *G02F 1/16753* (2019.01); *G02F 2202/28* (2013.01); *G02F 2203/02* (2013.01); *G06F 2203/04107* (2013.01)

(56) References Cited

U.S. PATENT DOCUMENTS

| | | | | |
|---|---|---|---|---|
| 2013/0229364 | A1* | 9/2013 | Yu | G06F 3/0446 345/173 |
| 2018/0203290 | A1* | 7/2018 | Qiu | G02F 1/133514 |
| 2022/0059619 | A1* | 2/2022 | Kubota | A61B 5/1455 |

* cited by examiner

TOUCH DISPLAY DEVICE

CROSS-REFERENCE TO RELATED APPLICATION

This application is a divisional application of and claims the priority benefit of U.S. application Ser. No. 18/091,380, filed on Dec. 30, 2022. The prior U.S. application Ser. No. 18/091,380 claims the priority benefit of Taiwan application serial no. 111105524, filed on Feb. 16, 2022. The entirety of each of the above-mentioned patent applications is hereby incorporated by reference herein and made a part of this specification.

BACKGROUND

Technical Field

The disclosure relates to a display device, and more particularly to a touch display device.

Description of Related Art

With the rapid development of technology, manufacturers of touch displays, home appliances or in-vehicle products have a tendency to use touch modules to replace traditional mechanical buttons as a new generation of input interfaces. However, the touch module still cannot completely avoid electromagnetic interference, and the display signal of the display may easily cause the touch module to sense the change of the capacitance value, thereby generating noise and affecting the sensing of the touch module.

SUMMARY

The disclosure provides a touch display device that is light and thin and achieves a good anti-noise effect.

The touch display device of the disclosure includes a reflective display module, a touch sensing layer, a light guide member, a ground shielding layer, and a first adhesive layer. The touch sensing layer is disposed on a display surface of the reflective display module, and the light guide member is arranged between the reflective display module and the touch sensing layer. The ground shielding layer is in contact with the light guide member and located between the reflective display module and the touch sensing layer. The ground shielding layer electrically connects to one of the reflective display module and the touch sensing layer, so as to electrically connect to a ground potential through the one of the reflective display module and the touch sensing layer. The first adhesive layer is disposed between the light guide member and the reflective display module, and is located between the ground shielding layer and the reflective display module.

In an embodiment of the disclosure, the light guide member of the above-mentioned touch display device includes a light guide plate and a low refractive index layer. The low refractive index layer is disposed on the light guide plate, and the refractive index of the low refractive index layer is smaller than the refractive index of the light guide plate.

In an embodiment of the disclosure, the ground shielding layer of the above-mentioned touch display device is in contact with the low refractive index layer.

In an embodiment of the disclosure, the light guide plate of the above-mentioned touch display device has a light incident surface, a first surface, and a second surface. The first surface and the second surface connect to the light incident surface and are opposite to each other, and at least one of the first surface and the second surface has multiple optical microstructures.

In an embodiment of the disclosure, the thickness of the low refractive index layer of the above-mentioned touch display device is greater than the thickness of the optical microstructures.

In an embodiment of the disclosure, the low refractive index layer of the above-mentioned touch display device includes a first low refractive index layer and a second low refractive index layer. The first low refractive index layer and the second low refractive index layer are disposed on the first surface and the second surface of the light guide plate, respectively.

In an embodiment of the disclosure, the above-mentioned touch display device further includes a second adhesive layer disposed between the touch sensing layer and the light guide member.

In an embodiment of the disclosure, the above-mentioned touch display device further includes a second adhesive layer and a cover plate. The second adhesive layer is disposed on the touch sensing layer, and the cover plate is disposed on the second adhesive layer.

In an embodiment of the disclosure, the ground shielding layer of the above-mentioned touch display device is located between the light guide member and the reflective display module.

In an embodiment of the disclosure, the ground shielding layer of the above-mentioned touch display device is located between the light guide member and the touch sensing layer.

In an embodiment of the disclosure, the above-mentioned touch display device further includes a light source. The light source is disposed on one side of the light guide member, and is adapted for emitting light toward the light guide member.

Based on the above, in the embodiments of the disclosure, by disposing the ground shielding layer between the reflective display module and the touch sensing layer, the signal of the reflective display module may be prevented from affecting the touch sensing layer. Thus, the touch sensing layer may have a good touch sensing function. In addition, in the disclosure, the ground shielding layer is directly integrated on the light guide member. Therefore, adding other film layers is not required, and the thickness of the touch display device may be further reduced, thereby facilitating the lightness and thinness of the touch display device.

In order to make the aforementioned features and advantages of the disclosure comprehensible, embodiments accompanied with drawings are described in detail as follows.

DESCRIPTION OF THE EMBODIMENTS

Figure 1A:
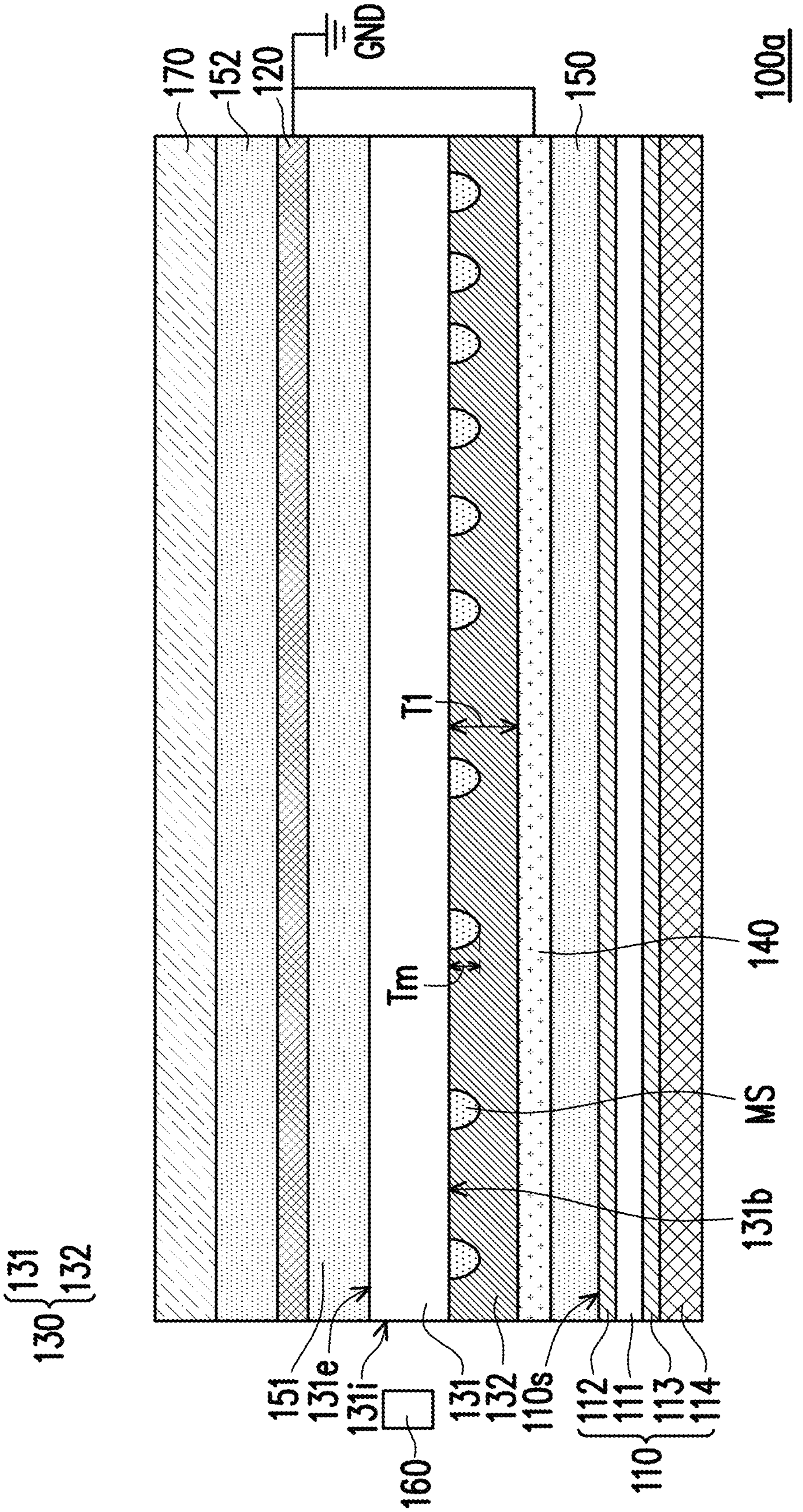
FIG. 1A is a schematic cross-sectional view of a touch display device according to an embodiment of the disclosure.

In the following embodiments, wordings used to indicate directions, such as "up," "down," "front," "back," "left," and "right," merely refer to directions in the accompanying drawings. Therefore, the directional wordings used are regarded as illustrative rather than restrictive of the disclosure.

In the accompanying drawings, the drawings illustrate the general features of the methods, structures, and/or materials used in the particular embodiments. The drawings shall not be interpreted as defining or limiting the scope or nature covered by the embodiments. For example, the relative size, thickness, and location of film layers, regions, and/or structures may be reduced or enlarged for clarity.

In the following embodiments, the same or similar elements will be designated by the same or similar reference numerals, and descriptions thereof will be omitted. In addition, the features of different embodiments may be combined with each other when they are not in conflict, and simple equivalent changes and modifications made according to the specification or the claims are still within the scope of the disclosure.

The terms such as "first" and "second" mentioned in the specification or the claims are only used to name discrete elements or to distinguish different embodiments or scopes and are not intended to limit the upper or lower limit of the number of the elements, nor are they intended to limit the manufacturing order or disposition order of the elements. Furthermore, the disposition of an element/film layer on (or over) another element/film layer may encompass the situation where the element/film layer is disposed directly on (or over) the other element/film layer, and the two elements/film layers are in contact with each other; and the situation where the element/film layer is indirectly disposed on (or over) the other element/film layer, and one or more elements/film layers exist between the two elements/film layers.

FIG. 1A is a schematic cross-sectional view of a touch display device according to an embodiment of the disclosure. Referring to FIG. 1A, a touch display device 100*a* includes a reflective display module 110, a touch sensing layer 120, a light guide member 130, a ground shielding layer 140, and a first adhesive layer 150. The touch sensing layer 120 is disposed on a display surface 110*s* of the reflective display module 110, and the light guide member 130 is disposed between the reflective display module 110 and the touch sensing layer 120. The ground shielding layer 140 is in contact with the light guide member 130 and located between the reflective display module 110 and the touch sensing layer 120. The ground shielding layer 140 electrically connects to the touch sensing layer 120, so as to electrically connect to a ground potential GND through the touch sensing layer 120. The first adhesive layer 150 is disposed between the light guide member 130 and the reflective display module 110, and is located between the ground shielding layer 140 and the reflective display module 110.

The reflective display module 110 presents a display image by reflecting ambient light or the illumination light provided by a front light module. The reflective display module 110 may be a liquid crystal on silicon (LCOS) panel, other types of reflective liquid crystal panels, or an electronic paper display. The electronic paper display may include an electrophoretic display (EPD) with particle imaging, a quick response liquid powder display (QR-LPD), a cholesteric liquid crystal display (Ch-LCD), a bistable nematic liquid crystal display (BiNem), or an electrochromic display (ECD), etc., and the disclosure is not limited thereto. In the embodiment, the reflective display module 110 adopts the electrophoretic display (EPD) as an exemplary illustration.

Further, as shown in FIG. 1A, the reflective display module 110 includes an electronic ink film layer 111, a first conductive layer 112, a second conductive layer 113, and a pixel circuit layer 114. The electronic ink film layer 111 is disposed between the first conductive layer 112 and the second conductive layer 113, and the pixel circuit layer 114 is disposed on the side away from the display surface 110S, and electrically connects to the first conductive layer 112 and the second conductive layer 113. The pixel circuit layer 114 includes signal lines, active elements, passive elements, etc., and may be integrated on a flexible printed circuit (FPC) (not shown). The active element in the pixel circuit layer 114 is, for example, a thin film transistor (TFT), and the passive element is, for example, a capacitor structure, but the two elements are not limited thereto. The pixel circuit layer 114 may provide corresponding driving signals to generate an electric field between the first conductive layer 112 and the second conductive layer 113, so as to control the positions of particles within a microcapsule or microcup of different colors (such as white or black or other colors) in the electronic ink film layer 111 to generate a display image. The first conductive layer 112 and the second conductive layer 113 are, for example, transparent conductive materials, such as indium oxide, tin oxide, indium tin oxide, or indium zinc oxide, but the disclosure is not limited thereto. Although not shown in the figure, the reflective display module 110 may further include a substrate carrying the first conductive layer 112, the second conductive layer 113, and the pixel circuit layer 114.

The touch sensing layer 120 is disposed on the reflective display module 110 by, for example, bonding. That is to say, the touch sensing layer 120 may be fabricated independently and then integrated with the reflective display module 110 by bonding. Although not shown in the figure, the touch sensing layer 120 may include a substrate, sensing electrodes, and sensing lines (not shown). The sensing electrodes and the sensing lines may be transparent conductive materials, such as indium oxide, tin oxide, indium tin oxide, or indium zinc oxide, for detecting the touch action of a user. The touch sensing layer 120 may be any capacitive touch sensing layer (e.g., a self-capacitive or mutual capacitive touch sensing layer) known to those of ordinary skill in the art for a touch sensing substrate or other forms of touch sensing layers (e.g., resistive or electromagnetic touch sensing layers), which is not limited in the disclosure.

The ground shielding layer 140 is disposed between the reflective display module 110 and the touch sensing layer 120, and may be used to shield signal interference between the reflective display module 110 and the touch sensing layer 120. In addition, the ground shielding layer 140 may electrically connect to the touch sensing layer 120 and electrically connect to the ground potential GND through the touch sensing layer 120. Such a configuration further helps to discharge excess charges to protect the touch sensing layer 120 and the reflective display module 110 from damage caused by static electricity. In other unillustrated embodiments, the ground shielding layer 140 may also electrically connect to the pixel circuit layer 114 of the reflective display module 110 to connect to the ground potential GND through the reflective display module 110.

The light guide member 130 includes a light guide plate 131 and a low refractive index layer, and the low refractive index layer may be disposed on at least one surface of the light guide plate 131. In the embodiment, the low refractive index layer includes a first low refractive index layer 132. The first low refractive index layer 132 is disposed on the light guide plate 131, and the refractive index of the first low refractive index layer 132 is smaller than the refractive index of the light guide plate 131.

The first low refractive index layer 132 is disposed between the ground shielding layer 140 and the light guide plate 131. The first low refractive index layer 132 in the embodiment may be selected from low refractive index resin, and the refractive index of the light guide plate 131 is greater than the refractive index of the first low refractive index layer 132. In some embodiments, the material of the light guide plate 131 includes, for example, thermoplastic polymers such as polymethyl methacrylate (PMMA), cycloolefin (COC), or polycarbonate (PC). The material of the light guide plate 131 may selectively have a lower composite refractive index for helping to avoid the rainbow pattern formed by unnecessary optical interference, but is not limited thereto. For example, the refractive index of the light guide plate 131 is approximately 1.58. The refractive index of the first low refractive index layer 132 needs to be smaller than the refractive index of the light guide plate 131, for example, greater than or equal to 1.32 and less than or equal to 1.43. The disclosure does not limit the value of the refractive index of the light guide plate 131 as long as the value is greater than the refractive index of the first low refractive index layer 132.

The light guide plate 131 of the embodiment has a light incident surface 131*i*, a first surface 131*b*, and a second surface 131*e*. The first surface 131*b* and the second surface 131*e* connect to the light incident surface 131*i* and are opposite to each other. The first low refractive index layer 132 is disposed on the first surface 131*b*, and the touch sensing layer 120 is disposed on one side of the second surface 131*e*. Moreover, the first surface 131*b* has multiple optical microstructures MS disposed between the light guide plate 131 and the first low refractive index layer 132. For example, the optical microstructures MS may be dot structures formed by ink printing or concave structures fabricated by injection molding or thermoforming, and the cross-sectional contours of the optical microstructures MS are, for example, circular, oval, or zigzag shapes, etc., and the disclosure is not limited thereto. In the embodiment, the optical microstructures MS may be dot structures and covered by the first low refractive index layer 132.

The touch display device 100*a* of the embodiment further includes a light source 160. The light source 160 is disposed on one side of the light incident surface 130*i* of the light guide plate 131, and is adapted for emitting light toward the light guide member 130. The reflective display module 110 provides display light by reflecting ambient light as illumination light. Therefore, when the ambient light is insufficient (such as a dark room), a problem of insufficient display light occurs. In the embodiment, by disposing the light source 160 and matching the light guide member 130, the required illumination light may be provided or supplemented when the ambient light is weak.

When the light emitted by the light source 160 enters the light guide plate 131 from the light incident surface 131*i*, due to the situation where the refractive index of the light guide plate 131 is greater than the refractive index of the first low refractive index layer 132 disposed on the first surface 131*b*, generating total internal reflection (TIR) for a part of the light is facilitated, so that the light may be easily transmitted to the entire light guide member 130 after entering the first surface 131*b*. Therefore, the first low refractive index layer 132 helps to improve the uniformity of light distribution. In addition to scattering light, the optical microstructures MS may also destroy total internal reflection, so that a part of the light emitted by the light source 160 from the light incident surface 131*i* is scattered from the first surface 131*b* through the optical microstructures MS and irradiates to the reflective display module 110 while being transmitted through total internal reflection in the light guide plate 131. The reflective display module 110 reflects the display light, so that the reflected display light passes through the ground shielding layer 140, the first low refractive index layer 132, and the light guide 130 in sequence and exits through the second surface 131*e*. In addition, the distribution density of the optical microstructures MS may be increased in the direction away from the light source 160, so as to increase the output ratio of light in the portion of the light guide plate 131 away from the light incident surface 131*i*, whereby the brightness of the light guide member 130 is more uniform and consistent.

The light source 160 may be a combination of multiple light emitting diodes (LEDs). The light emitting diode is, for example, a sub-millimeter light emitting diode (mini LED) or a micro light emitting diode (micro LED). Since the light source 160 of the disclosure is used to provide or supplement the illumination light required when the ambient light is weak, the light source 160 is preferably a white light source. The white light source may be directly composed of white light emitting diodes or utilize wavelength conversion materials to convert the light emitted by non-white light emitting diodes (such as blue light or ultraviolet light) into color light (such as red light, green light, or blue light) that may be mixed into white light. The wavelength conversion material is, for example, yellow fluorescent powder ($Y_3Al_5O_{12}$:$Ce^{3+}$, YAG) or fluoride fluorescent powder ($K_2SiF_6$:$Mn4^+$, KSF), but the disclosure is not limited thereto.

It is worth mentioning that the thickness Tm of the optical microstructures MS is smaller than the thickness T1 of the first low refractive index layer 132. Such a design may facilitate the disposition and uniform distribution of the ground shielding layer 140, as well as the flattening of the interface between the first low refractive index layer 132 and the ground shielding layer 140, so as to prevent unwanted refraction and reflection from interfering with the transmission of the display light.

Moreover, the ground shielding layer 140 is directly formed on the light guide member 130. Further, the ground shielding layer 140 in the embodiment is formed on the first low refractive index layer 132 and bonded to the display surface 110S of the reflective display module 110 through the first adhesive layer 150. That is to say, the ground shielding layer 140 of the touch display device 100*a* of the embodiment is located between the light guide member 130 and the reflective display module 110. The material of the ground shielding layer 140 may include conductive oxides with high visible light transmittance such as indium zinc oxide, indium tin oxide (ITO), and the like. The manufacturing method of the ground shielding layer 140 may be realized by using process methods known to those of ordinary skill in the art, including the deposition method and the sputter deposition method, and the disclosure is not limited thereto.

By disposing the ground shielding layer 140 between the reflective display module 110 and the touch sensing layer 120 and electrically connecting the ground shielding layer 140 to the ground potential GND, the signals of the reflective display module 110 may be prevented from interfering with the touch sensing layer 120. Thus, the touch sensing layer 120 may have a good touch sensing function. Moreover, in the embodiment, the ground shielding layer 140 is directly formed on the first low refractive index layer 132, thereby integrating the ground shielding layer 140 into the light guide member 130. Therefore, adding other film layers is not required, and the thickness of the touch display device 100*a* may be further reduced, thereby facilitating the lightness and thinness of the touch display device 100*a*.

The touch display device 100*a* may use the first adhesive layer 150 to bond the light guide member 130 to the reflective display module 110. Besides, the touch display device 100*a* further includes a second adhesive layer 151 disposed between the touch sensing layer 120 and the light guide member 130. More specifically, the touch sensing layer 120 may be attached to the second surface 131*e* of the light guide plate 131 through the second adhesive layer 151. The materials of the first adhesive layer 150 and the second adhesive layer 151 include optical clear adhesive (OCA), optical pressure sensitive adhesive (PSA), polyurethane reactive (PUR) adhesive, polyurethane (PU) adhesive, or other suitable optical grade adhesive materials. In particular, the material of the adhesive layer may be selected from an optical adhesive material with high transmittance (such as optical clear adhesive). For example, in the embodiment, the visible light transmittance of the first adhesive layer 150 and the second adhesive layer 151 may be greater than 99%, but is not limited thereto.

The touch display device 100*a* further includes a cover plate 170 and a third adhesive layer 152. The cover plate 170 is attached to the touch sensing layer 120 through the third adhesive layer 152. The material of the cover plate 170 is, for example, glass, quartz, or other suitable macromolecule polymers (such as polycarbonate). The material of the third adhesive layer 152 may be the same as the materials of the first adhesive layer 150 and the second adhesive layer 151, and is not repeated here.

The above-mentioned first adhesive layer 150, second adhesive layer 151, and third adhesive layer 152 are only used for illustrative description of the quantity, and are not used to limit the difference in the types of elements.

Other embodiments are described below to explain the disclosure in detail, and the same components will be denoted by the same reference numerals, and the description of the same technical content will be omitted. For the description of the omitted part, reference may be made to the above embodiment, and details are not described in the following embodiments.

Figure 1B:
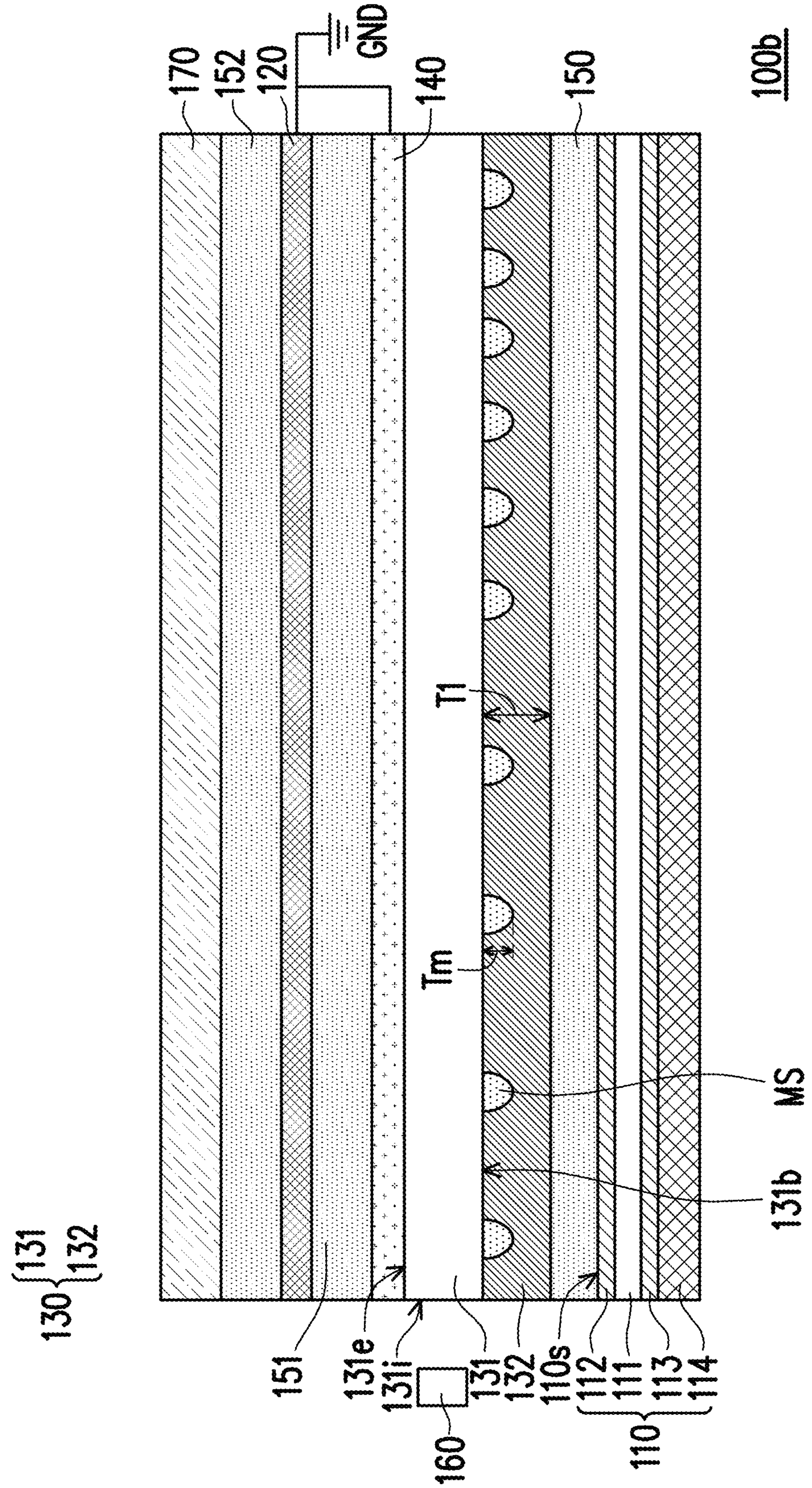
FIG. 1B is a schematic cross-sectional view of a touch display device according to another embodiment of the disclosure.

FIG. 1B is a schematic cross-sectional view of a touch display device according to another embodiment of the disclosure. Referring to FIG. 1B, a touch display device 100*b* of the embodiment is similar to the touch display device 100*a* of FIG. 1A. The touch display device 100*b* includes a reflective display module 110, a touch sensing layer 120, a light guide member 130, a ground shielding layer 140, a first adhesive layer 150, a second adhesive layer 151, a light source 160, a cover plate 170, and a third adhesive layer 152. The difference between the touch display device 100*b* and the touch display device 100*a* of FIG. 1A is that the configuration position of the ground shielding layer 140 is different. Specifically, the ground shielding layer 140 of the touch display device 100*a* is disposed between the display surface 110S and the first low refractive index layer 132, but the ground shielding layer 140 of the touch display device 100*b* of the embodiment is located between the light guide member 130 and the touch sensing layer 120.

Further, the ground shielding layer 140 of the touch display device 100*b* is disposed between the light guide plate 131 and the second adhesive layer 151. Since the material selected for the ground shielding layer 140 in the embodiment may be ITO, and such a material has a high absorption rate in the ultraviolet wavelength band, in addition to achieving the aforementioned signal shielding effect, the ground shielding layer 140 may further protect the light guide plate 131 formed of polymers, multiple optical microstructures MS, and the first low refractive index layer 132 from being irradiated by ambient ultraviolet light and degraded.

Figure 2:
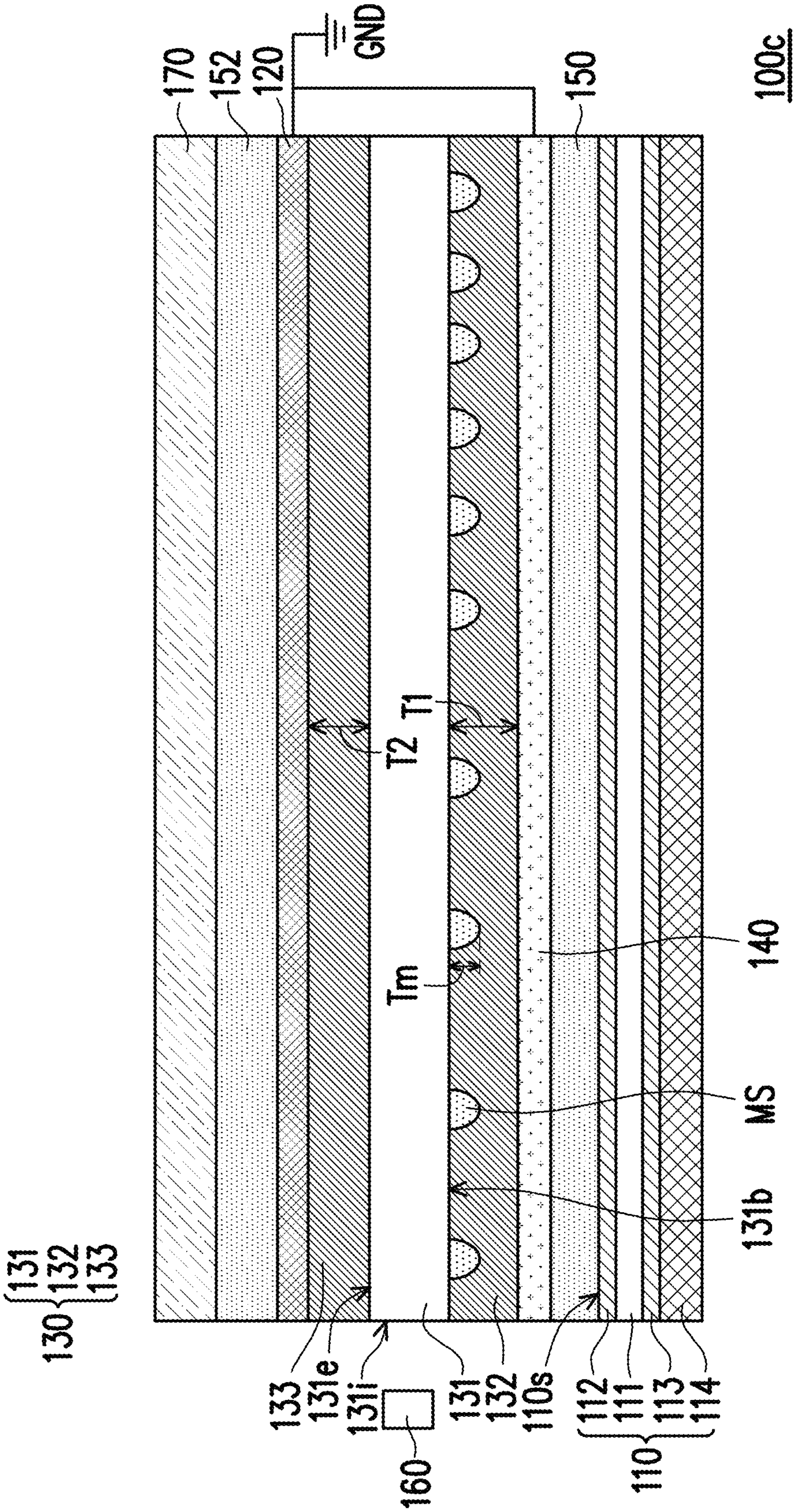
FIG. 2 is a schematic cross-sectional view of a touch display device according to still another embodiment of the disclosure.

FIG. 2 is a schematic cross-sectional view of a touch display device according to still another embodiment of the disclosure. Referring to FIG. 2, a touch display device 100*c* of the embodiment is similar to the touch display device 100*a* of FIG. 1A. The touch display device 100*c* includes a reflective display module 110, a touch sensing layer 120, a light guide member 130, a ground shielding layer 140, a first adhesive layer 150, a light source 160, a cover plate 170, and a third adhesive layer 152. The difference between the touch display device 100*c* and the touch display device 100*a* of FIG. 1A is that the light guide member 130 of the touch display device 100*c* further includes a second low refractive index layer 133 in contact with the touch sensing layer 120 and the light guide plate 131, and the touch display device 100*c* is not disposed with a second adhesive layer 151. In addition, the touch sensing layer 120 is, for example, in contact with the light guide member 130.

Specifically, in the touch display device 100*c* of the embodiment, the first low refractive index layer 132 and the second low refractive index layer 133 are disposed on the first surface 131*b* and the second surface 131*e* of the light guide plate 131, respectively. The materials of the first low refractive index layer 132 and the second low refractive index layer 133 may be the same or different as long as the refractive index of the light guide plate 131 is greater than the refractive indexes of the first low refractive index layer 132 and the second low refractive index layer 133. However, the disclosure is not limited thereto. In addition, the thickness T2 of the second low refractive index layer 133 and the thickness T1 of the first low refractive index layer 132 may be the same as each other.

In summary, since the first low refractive index layer 132 and the second low refractive index layer 133 are respectively disposed on the first surface 131*b* and the second surface 132*e* of the light guide plate 131 of the touch display device 100*c*, in addition to the aforementioned advantages of the touch display device 100*a*, the light guide effect of the light guide plate 131 may be further increased.

Moreover, the touch sensing layer 120 of the embodiment may be directly fabricated on the second low refractive index layer 133 of the light guide member 130, and then the cover plate 170 may be attached to the touch sensing layer 120 by using the third adhesive layer 152. The method of fabricating the touch sensing layer 120 may be to form a conductive layer on the second low refractive index layer 133 by chemical vapor deposition (CVD) or physical vapor deposition (PVD) or other methods, and then selectively cooperate with the patterning process (such as lithography, etching, etc.) to form the corresponding sensing electrodes and the required insulating layer, so that the touch sensing layer 120 is directly fabricated on the second low refractive index layer 133 of the light guide member 130. In other words, in the embodiment, the touch sensing layer 120 is directly integrated on the light guide member 130, so that no additional bonding layer is required between the touch sensing layer 120 and the light guide member 130. Such a configuration may reduce the use of bonding materials and the steps of the manufacturing process, improve yield, and reduce production costs.

Figure 3A:
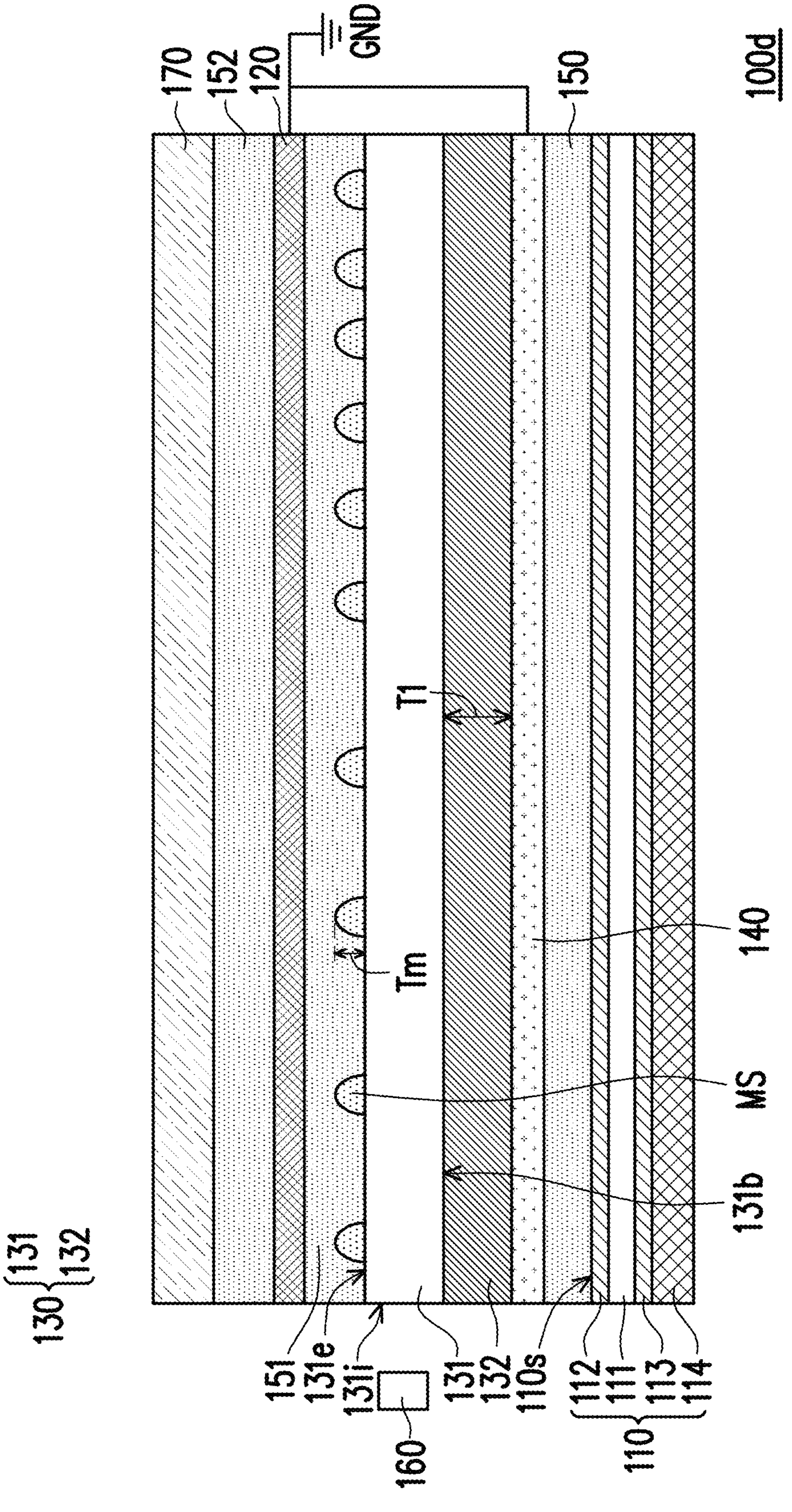
FIG. 3A is a schematic cross-sectional view of a touch display device according to yet another embodiment of the disclosure.

FIG. 3A is a schematic cross-sectional view of a touch display device according to yet another embodiment of the disclosure. Referring to FIG. 3A, a touch display device 100*d* of the embodiment is similar to the touch display device 100*a* of FIG. 1A. The touch display device 100*d* includes a reflective display module 110, a touch sensing layer 120, a light guide member 130, a ground shielding layer 140, a first adhesive layer 150, a second adhesive layer 151, a light source 160, a cover plate 170, and a third adhesive layer 152. The difference between the touch display device 100*d* and the touch display device 100*a* of FIG. 1A is that multiple optical microstructures MS of the touch display device 100*d* are disposed on the second surface 131*e* of the light guide plate 131.

Further, in the embodiment, the optical microstructures MS are disposed on the second surface 131*e* of the light guide plate 131, and the optical microstructures MS are covered by the second adhesive layer 151. In this way, when irradiating to the second surface 131*e*, the light entering the light guide plate 131 from the light incident surface 131*i* is scattered by the optical microstructures MS, returns to the first surface 131*b* of the light guide plate 131, and irradiates to the reflective display module 110 to provide enough light for display.

Figure 3B:
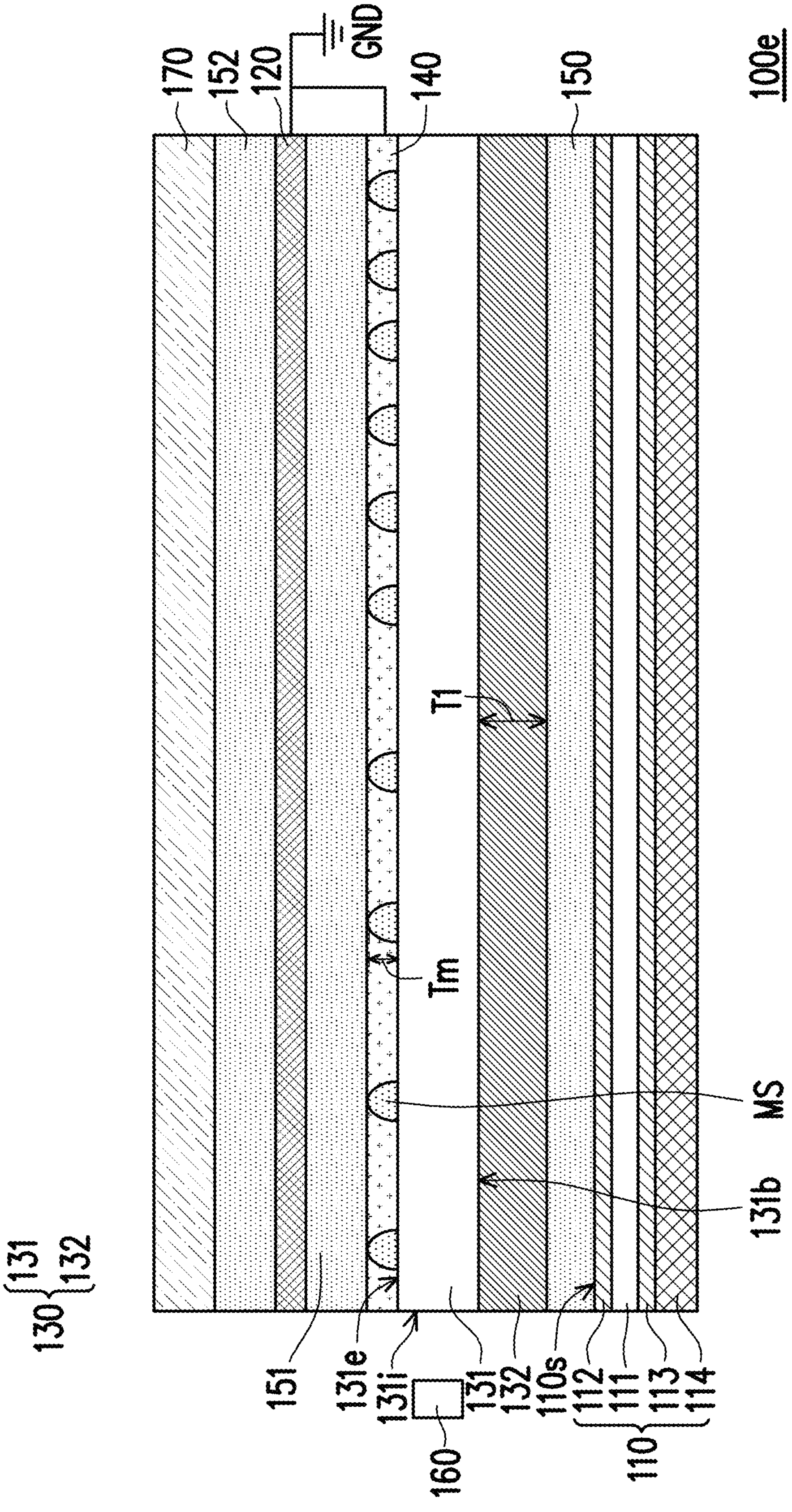
FIG. 3B is a schematic cross-sectional view of another embodiment of the touch display device of FIG. 3A.

FIG. 3B is a schematic cross-sectional view of another embodiment of the touch display device of FIG. 3A. Referring to FIG. 3B, a touch display device 100*e* of the embodiment is similar to the touch display device 100*d* of FIG. 3A. The touch display device 100*e* includes a reflective display module 110, a touch sensing layer 120, a light guide member 130, a ground shielding layer 140, a first adhesive layer 150, a second adhesive layer 151, a light source 160, a cover plate 170, and a third adhesive layer 152. The difference between the touch display device 100*e* and the touch display device 100*d* of FIG. 3A is that the configuration position of the ground shielding layer 140 is different. Specifically, the ground shielding layer 140 of the touch display device 100*d* is disposed between the display surface 110S and the first low refractive index layer 132. However, the ground shielding layer 140 of the touch display device 100*e* of the embodiment is disposed on the second surface 131*e* of the light guide plate 131 and covers multiple optical microstructures MS.

Since the ground shielding layer 140 of the touch display device 100*e* is disposed on the second surface 131*e* of the light guide plate 131, a similar effect to the aforementioned touch display device 100*b* may also be achieved, which is not repeated here. In addition, by covering the ground shielding layer 140 and the optical microstructures MS with the second adhesive layer 151, increasing the flatness of disposing elements in subsequent processes is facilitated, so as to prevent unwanted refraction and reflection from interfering with the transmission of display light.

Figure 4:
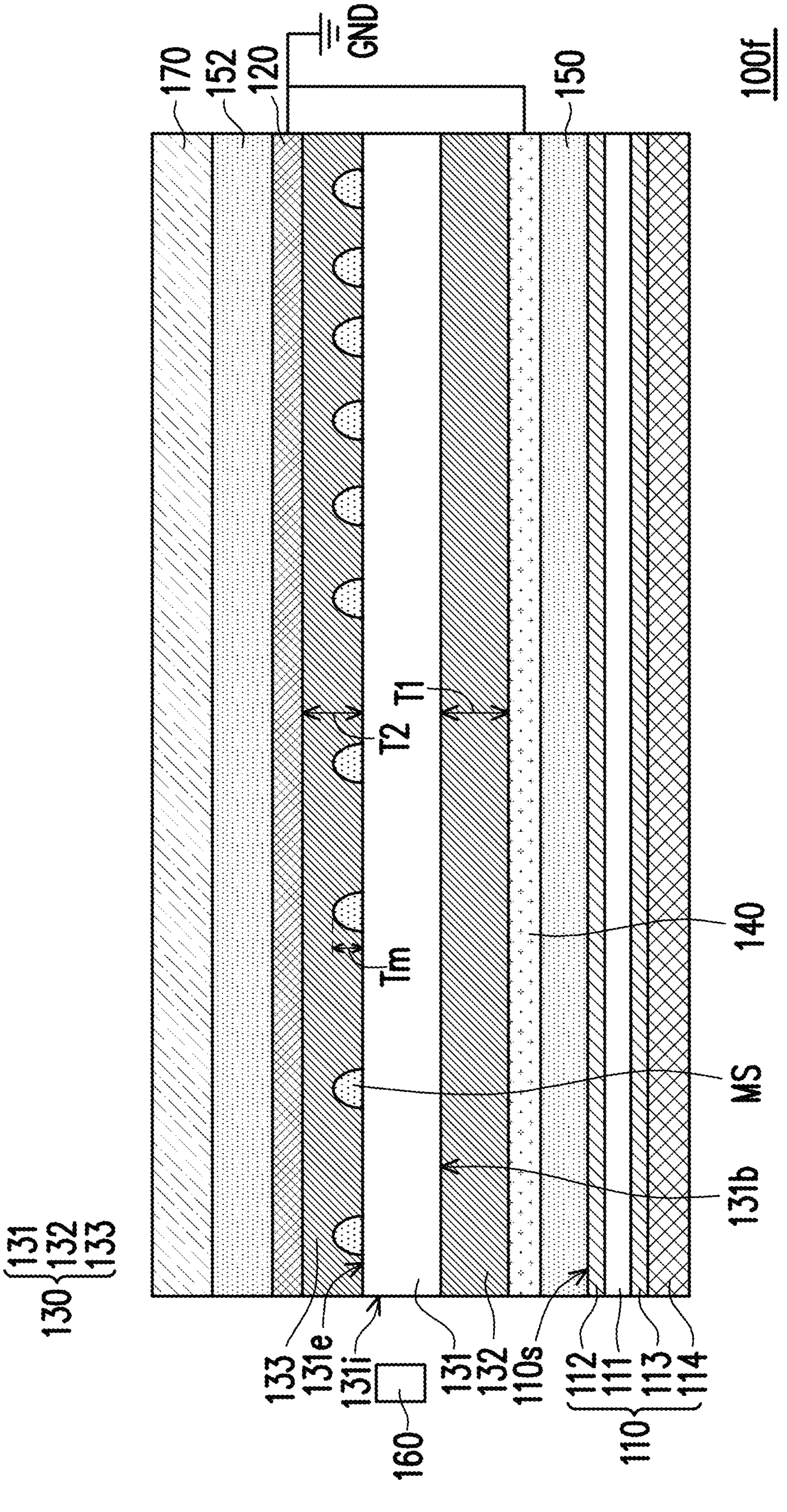
FIG. 4 is a schematic cross-sectional view of a touch display device according to yet another embodiment of the disclosure.

FIG. 4 is a schematic cross-sectional view of a touch display device according to yet another embodiment of the disclosure. Referring to FIG. 4, a touch display device 100*f* of the embodiment is similar to the touch display device 100*c* of FIG. 2. The touch display device 100*f* includes a reflective display module 110, a touch sensing layer 120, a light guide member 130, a ground shielding layer 140, a first adhesive layer 150, a light source 160, a cover plate 170, and a third adhesive layer 152. The difference between the touch display device 100*f* and the touch display device 100*c* of FIG. 2 is that multiple optical microstructures MS of the touch display device 100*f* are disposed on the second surface 131*e* of the light guide plate 131, and the second low refractive index layer 133 covers the optical microstructures MS. Thus, the touch display device 100*f* of the embodiment may have the advantages of both the touch display device 100*c* in FIG. 2 and the touch display device 100*d* in FIG. 3A, which are not repeated here.

In summary, in the embodiment of the disclosure, by disposing the ground shielding layer between the reflective display module and the touch sensing layer, the signal of the reflective display module may be prevented from affecting and/or interfering with the sensing function of the touch sensing layer. Thus, the touch sensing layer may have a good touch sensing function. In addition, in the disclosure, the ground shielding layer is directly integrated on the light guide member. Therefore, adding other film layers is not required, and the thickness of the touch display device may be further reduced, thereby facilitating the lightness and thinness of the touch display device.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A touch display device, comprising:

a reflective display module having a display surface;

a touch sensing layer disposed on the display surface;

a light guide member disposed between the reflective display module and the touch sensing layer and comprising a light guide plate having a plurality of optical microstructures on a first surface of the light guide plate;

a ground shielding layer in direct contact with the optical microstructures on the first surface of the light guide plate and located between the light guide member and the touch sensing layer, and the ground shielding layer electrically connecting to one of the reflective display module and the touch sensing layer to electrically connect to a ground potential through the one of the reflective display module and the touch sensing layer;

a first adhesive layer disposed between the light guide member and the reflective; display module, and located between the ground shielding layer and the reflective display module; and a second adhesive layer disposed between the touch sensing layer and the light guide member, wherein the second adhesive layer covers the ground shielding layer and the optical microstructures, and the second adhesive layer is located between the touch sensing layer and the ground shielding layer, wherein a material of the ground shielding layer comprises indium oxide, tin oxide, indium tin oxide, or indium zinc oxide, and a refractive index of the ground shielding layer is greater than a refractive index of the light guide member.

2. The touch display device according to claim 1, wherein the light guide member further comprises a low refractive index layer, the low refractive index layer is disposed on the light guide plate, and a refractive index of the low refractive index layer is smaller than a refractive index of the light guide plate.

3. The touch display device according to claim 2, wherein the light guide plate further has a light incident surface, and a second surface, and the first surface and the second surface connect to the light incident surface and are opposite to each other.

4. The touch display device according to claim 3, wherein thickness of the low refractive index layer is greater than thickness of the plurality of optical microstructures.

5. The touch display device according to claim 1, wherein the ground shielding layer flattens an uneven structure of the optical microstructures.

6. The touch display device according to claim 1, further comprising:

a third adhesive layer disposed on the touch sensing layer; and a cover plate disposed on the third adhesive layer.

* * * * *